(12) United States Patent
Ueda

(10) Patent No.: US 7,881,037 B2
(45) Date of Patent: Feb. 1, 2011

(54) VEHICLE OCCUPANT PROTECTION APPARATUS

(75) Inventor: Goro Ueda, Nishio (JP)

(73) Assignee: Denso Corporation, Kariya (JP)

( * ) Notice: Subject to any disclaimer, the term of this patent is extended or adjusted under 35 U.S.C. 154(b) by 472 days.

(21) Appl. No.: 12/080,963

(22) Filed: Apr. 8, 2008

(65) Prior Publication Data

US 2008/0258444 A1  Oct. 23, 2008

(30) Foreign Application Priority Data

Apr. 23, 2007  (JP)  ............... 2007-113221

(51) Int. Cl.
*F23Q 7/00*  (2006.01)
(52) U.S. Cl. .................. 361/248; 307/10.1
(58) Field of Classification Search ........... 361/248; 307/10.1; 102/200, 218; 280/735
See application file for complete search history.

(56) References Cited

U.S. PATENT DOCUMENTS

| | | | | |
|---|---|---|---|---|
| 5,046,149 | A | * | 9/1991 | Nunan ................. 307/10.1 |
| 5,204,547 | A | * | 4/1993 | Schumacher et al. ...... 307/10.1 |
| 5,805,058 | A | * | 9/1998 | Saito et al. ................. 340/436 |
| 5,872,460 | A | | 2/1999 | Bennett et al. |
| 5,882,034 | A | * | 3/1999 | Davis et al. .............. 280/735 |
| 6,133,741 | A | | 10/2000 | Mattes et al. |
| 6,218,738 | B1 | | 4/2001 | Fujishima |
| 6,652,001 | B2 | * | 11/2003 | Furui .................... 280/735 |
| 7,268,445 | B2 | | 9/2007 | Uono et al. |
| 2004/0164534 | A1 | | 8/2004 | Higashiyama |

FOREIGN PATENT DOCUMENTS

| | | |
|---|---|---|
| DE | 19904367 | 8/1999 |
| JP | 2004-255911 | 9/2004 |
| JP | 2005-255032 | 9/2005 |
| WO | WO 98/36285 | 8/1998 |

OTHER PUBLICATIONS

Extended Search Report dated Nov. 2, 2010 from European Application No. 08007116.0.

* cited by examiner

*Primary Examiner*—Jared J Fureman
*Assistant Examiner*—Christopher J Clark
(74) *Attorney, Agent, or Firm*—Harness, Dickey & Pierce, PLC

(57) ABSTRACT

An air bag device of the present invention includes squibs and a capacitor, an electric discharge circuit as well as a backup power supply, a voltage stabilizer and ignition circuits. The voltage stabilizer converts the voltage of the backup power supply to the predetermined target voltage, and the converted voltage is supplied for the ignition circuit. The capacitor removes a noise emitted by the ignition circuit. The electric discharge circuit discharges electricity accumulated in the capacitor right after the supply of an ignition current from the ignition circuit has ended. In this manner, a voltage rise of the capacitor occurring after the end of the supply of the ignition current can be resolved immediately, thereby enabling a supply of a stable ignition current for the squibs.

5 Claims, 3 Drawing Sheets

VEHICLE OCCUPANT PROTECTION APPARATUS

CROSS REFERENCE TO RELATED APPLICATION

The present application is based on and claims the benefit of priority of Japanese Patent Application No. 2007-113221 filed on Apr. 23, 2007, the disclosure of which is incorporated herein by reference.

FIELD OF THE INVENTION

The present disclosure generally relates to a vehicle occupant protection apparatus.

BACKGROUND INFORMATION

Conventionally, regarding a vehicle occupant protection apparatus protecting the occupant of the vehicle, a technique is disclosed in a form of an air bag system disclosed by, for example, Japanese Patent Laid-Open No. JP-A-2004-255911 (US20040164534). The air bag system has a switching element for safety and a switching element drive circuit as well as an IC and a squib. The IC consists of a LO side switching element and a LO side drive circuit with a HI side switching element and a HI side drive circuit. The switching element for safety, the HI side switching element and the LO side switching element are connected in series. In addition, the switching element for safety is connected to a power supply. Furthermore, between the HI side switching element and the LO side switching element, the squib is interposed.

There are air bag systems, in some cases, having plural squibs. When plural squibs are used, plural ICs having squibs connected thereto are connected to one switching element for safety. In addition, a capacitor for the noise rejection use is connected to the connecting point of the switching element and the IC for safety to remove a noise emitted from the IC to the outside of the IC.

The switching element for safety is driven by the switching element drive circuit, and the voltage of the power supply is converted into the predetermined voltage to be supplied to each of the ICs. When the HI side switching element and the LO side switching element of a certain IC become an ON state at the same time, an ignition electric current flows to connected squibs. The ignition electric current is intercepted afterwards when the HI side switching element and LO side switching element become an off state together. Then, the electric current flowing through the circuit flows into a capacitor for noise rejection, and the capacitor is charged. Therefore, the voltage of the connecting point of the switching element for safety and the IC suddenly rises. This state will be maintained for a while, because there is no electric discharge route. Upon having the above state, the switching element drive circuit drives the switching element for safety to lower the voltage of the connecting point. When the HI side switching element and the LO side switching element of another IC become an ON state together, an ignition electric current flows to connected squibs. However, the switching element drive circuit is driving the switching element for safety to lower the voltage of the connecting point. Further, because the capacitor is for noise rejection use, the capacity of the capacitor is small, and only a slight electric charge is accumulated even after the voltage rise by charging. Therefore, it is possible, in some cases, that a sufficient amount of electric current is not provided for the squib.

SUMMARY OF THE INVENTION

In view of above and other problems, the present invention provides a vehicle occupant protection apparatus which can stably supply an ignition electric current for each of plural squibs.

The inventor of the present invention has established an idea that the stable operation of the voltage stabilizer and a stable supply of an ignition current for each of plural squibs are achieved by having a discharge circuit that discharges electricity being accumulated from a capacitor immediately after the supply of the ignition electric current is finished through repeated experiments.

In other words, the vehicle occupant protection apparatus of the present invention includes: a power source capable of supplying electric power; a constant voltage circuit capable of outputting a predetermined voltage by converting a voltage of the power source in an electrical connection with the power source; a plurality of ignition circuits capable of supplying an ignition current for a squib by having an electrical connection with the power source; a capacitor capable of reducing noise, which is in an electrical connection with a connection point between the constant voltage circuit and the plurality of the ignition circuits on one end, and is in an electrical connection with a ground on another end; and a discharge circuit capable of discharging electricity stored in the capacitor immediately after a supply of the ignition current from the ignition circuit has been finished.

According to the above configuration, the voltage rise of the capacitor occurring just after the end of supply of the ignition electric current can be resolved immediately. Therefore, the voltage stabilizer does not have to work to lower the voltage of the connecting point to the ignition circuit as disclosed in the background section. Therefore, an ignition electric current can be supplied stably for each of plural squibs.

BRIEF DESCRIPTION OF THE DRAWINGS

Other objects, features and advantages of the present invention will become more apparent from the following detailed description made with reference to the accompanying drawings, in which.

DETAILED DESCRIPTION

An embodiment of the present invention is explained in detail. In the present embodiment, the example where a vehicle occupant protection apparatus of the present invention is applied to an air bag apparatus is shown.

Figure 1:
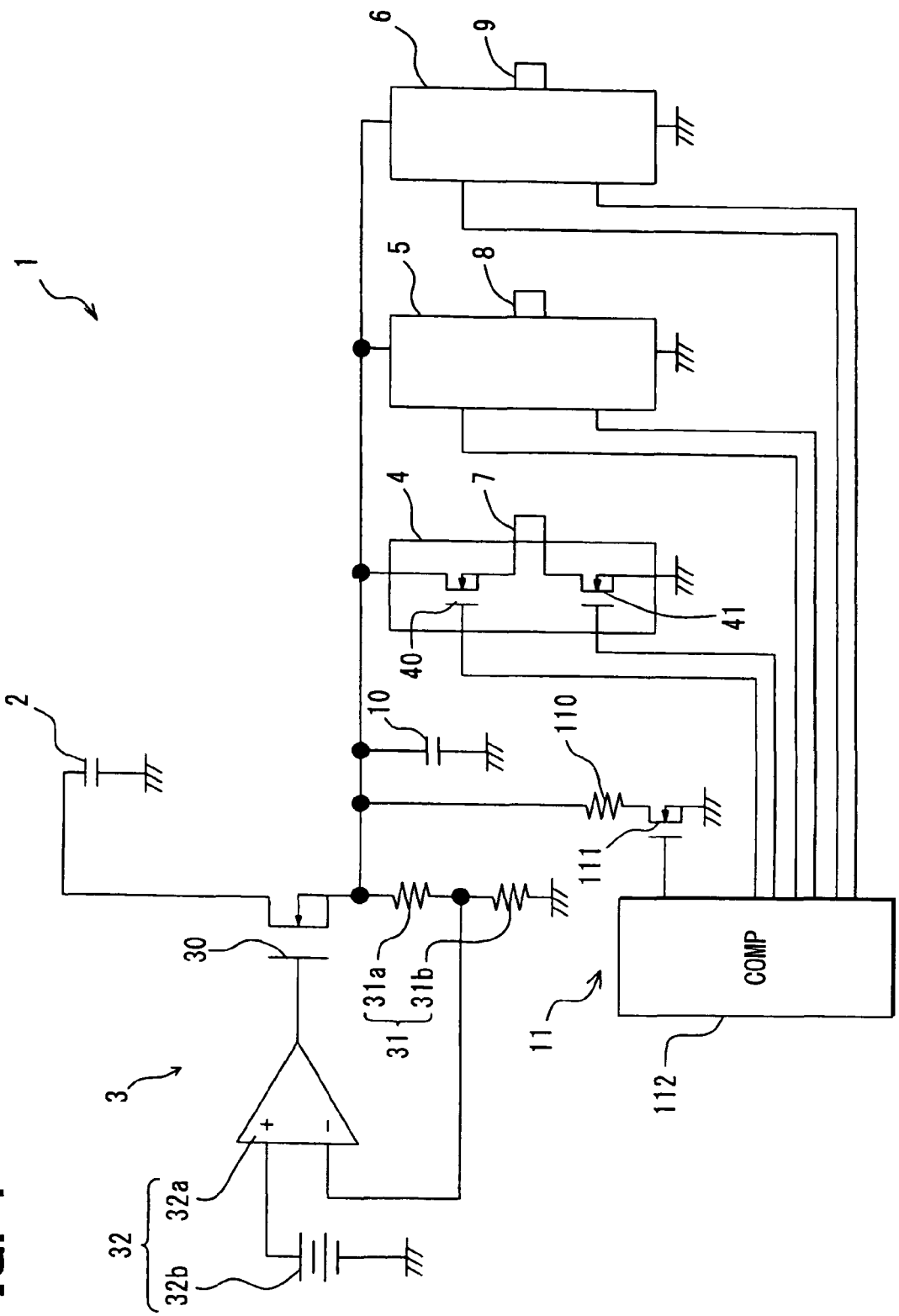
FIG. 1 shows a block diagram of an air bag apparatus in an embodiment of the present invention.

At first in FIG. 1, the configuration of the air bag apparatus is explained. FIG. 1 is a circuit diagram of the air bag apparatus in the present embodiments.

An air bag apparatus 1 (a vehicle occupant protection apparatus) includes a backup power supply 2 (a power supply), a voltage stabilizer 3, ignition circuits 4-6, squibs 7-9, a capacitor 10 and an electric discharge circuit 11 as shown in FIG. 1.

The backup power supply 2 is charged by a booster circuit (not shown), and the supply 2 is a circuit supplying the voltage to the voltage stabilizer 3. The backup power supply 2 is formed by a large-capacity capacitor. The voltage of the backup power supply 2 is converted to the predetermined target voltage and is supplied for the ignition circuits 4-6 by the voltage stabilizer 3. The voltage stabilizer 3 consists of a third FET 30, a voltage detecting circuit 31 and a third FET control circuit 32.

The third FET 30 is an element which converts the voltage of the backup power supply 2 to the predetermined target voltage. The drain of the third FET 30 is connected to the backup power supply 2, the source of the third FET 30 is connected to the ignition circuits 4-6, and the gate of the third FET 30 is connected to the third FET control circuit 32.

The voltage detecting circuit 31 is a circuit that detects the voltage of the source of the third FET 30 by dividing the voltage. The voltage detecting circuit 31 consists of resistors 31*a*, 31*b*. The resistor 31*a*, 31*b* are in series connection. The resistors 31*a*, 31*b* in series connection are connected to the source of the third FET 30 at one ends, and are connected to the ground at the other ends. In addition, the connecting point of the resistors 31*a*, 31*b* is connected to the third FET control circuit 32.

The third FET control circuit 32 is a circuit controlling the third FET 30 to convert the voltage of the backup power supply 2 to the predetermined target voltage based on a detection result of the voltage detecting circuit 31. The third FET control circuit 32 consists of an op-amp 32*a* and a reference supply 32*b*. The op-amp 32*a* is a circuit amplifying the source voltage of the third FET 30 divided by the resistors 31*a*, 31*b* based on the voltage of the reference supply 32*b* being referenced as a standard. The op-amp 32*a* has a non-inverted input terminal connected to the reference supply 32*b*, an inversion input terminal connected to the connection point of the resistors 31*a*, 31*b*, and an output terminal connected to the gate of the third FET 30. The voltage of the reference supply 32*b* is set to a value that is derived by dividing the predetermined target voltage by a ratio of the divided voltage that is determined by the resistance values of the resistors 31*a*, 31*b*.

The ignition circuits 4-6 in connection with the voltage stabilizer 3 are circuits controlling the ignition electric current flowing in the squibs 7-9 based on an ignition signal. When an ignition signal is input, the ignition circuits 4-6 supply an ignition electric current to the squibs 7-9. The squibs 7-9 are elements that deploy the air bag (not shown) by being ignited with a flow of an electric current. The ignition circuits 4-6 respectively have the same configuration. In addition, the squibs 7-9 respectively have the same configuration. The ignition circuit 4 and the squib 7 are explained in the following.

The ignition circuit 4 consists of a high side FET 40 and a low side FET 41. The high side FET 40 in connection with one end of the squib 7 is an element for connecting the squib 7 to the voltage stabilizer 3. The drain of the high side FET 40 is connected to the source of the third FET 30, and the source of the FET 40 is connected to one end of the squib 7. In addition, the gate of the FET 40 is connected to a microcomputer 112 being mentioned later. The low side FET 41 is connected to the other end of the squib 7, for grounding the squib 7. The drain of the low side FET 41 is connected to the other end of the squib 7, and the source of the FET 41 is grounded. In addition, the gate of the FET 41 is connected to the microcomputer 112.

The capacitor 10 is an element to remove a noise emitted from the ignition circuits 4-6 to the outside of the circuits 4-6. The capacitor is, for example, an element of the small capacity of around 0.1 μF. One end of the capacitor 10 is connected to a connecting point between the third FET 30 and the ignition circuits 4-6, and the other end is grounded.

The electric discharge circuit 11 is a circuit discharging electricity that is accumulated as charged electricity in the capacitor 10 on a predetermined condition. The electric discharge circuit 11 consists of a resistor 110 and a FET 111 (a switching element for electric discharges) and the microcomputer 112 (an electric discharge control circuit).

The resistor 110 is an element to limit an electric current at the time of the electric discharge. One end of the resistor 110 is connected to a connecting point between the ignition circuits 4-6 and the third FET 30 that has one end of the capacitor 10 connected thereto. In addition, the other end of the resistor 110 is connected to the FET 111 for electric discharges. The resistor 110 has an ohmic value set so that an electric current at the time of the electric discharge becomes 20 mA-around 30 mA.

The FET 111 for electric discharges grounds the resistor 110 when it is turned on, and it is an element to discharge electric charge accumulated in the capacitor 10. The drain of the FET 111 for electric discharges is connected to the other end of the resistor, and the source of the FET 111 is grounded. In addition, the gate of the FET 111 is connected to the microcomputer 112.

The microcomputer 112 is an element to turn on the FET 111 for electric discharges at the time of predetermined condition. In addition, based on the information from various sensors (not shown) installed on the vehicle, the microcomputer 112 is an element outputting an ignition signal to control the ignition circuits 4-6. The microcomputer 112 determines whether a vehicle has collided with an object based on the information being input from various sensors (not shown). Then, the ignition signal is output for a corresponding ignition circuit to let the air bag unfold when it is determined that the vehicle has collided. In addition, based on the ignition signal to output, it turns on the FET 111 for electric discharges. More practically, for a period substantially between 10 μseconds before outputting the ignition signal and 10 μseconds after outputting the signal, the FET 111 is turned on. The microcomputer 112 is connected to the gate of the FET 111 for electric discharges. In addition, it is connected to each of the ignition circuits 4-6.

Figure 2:
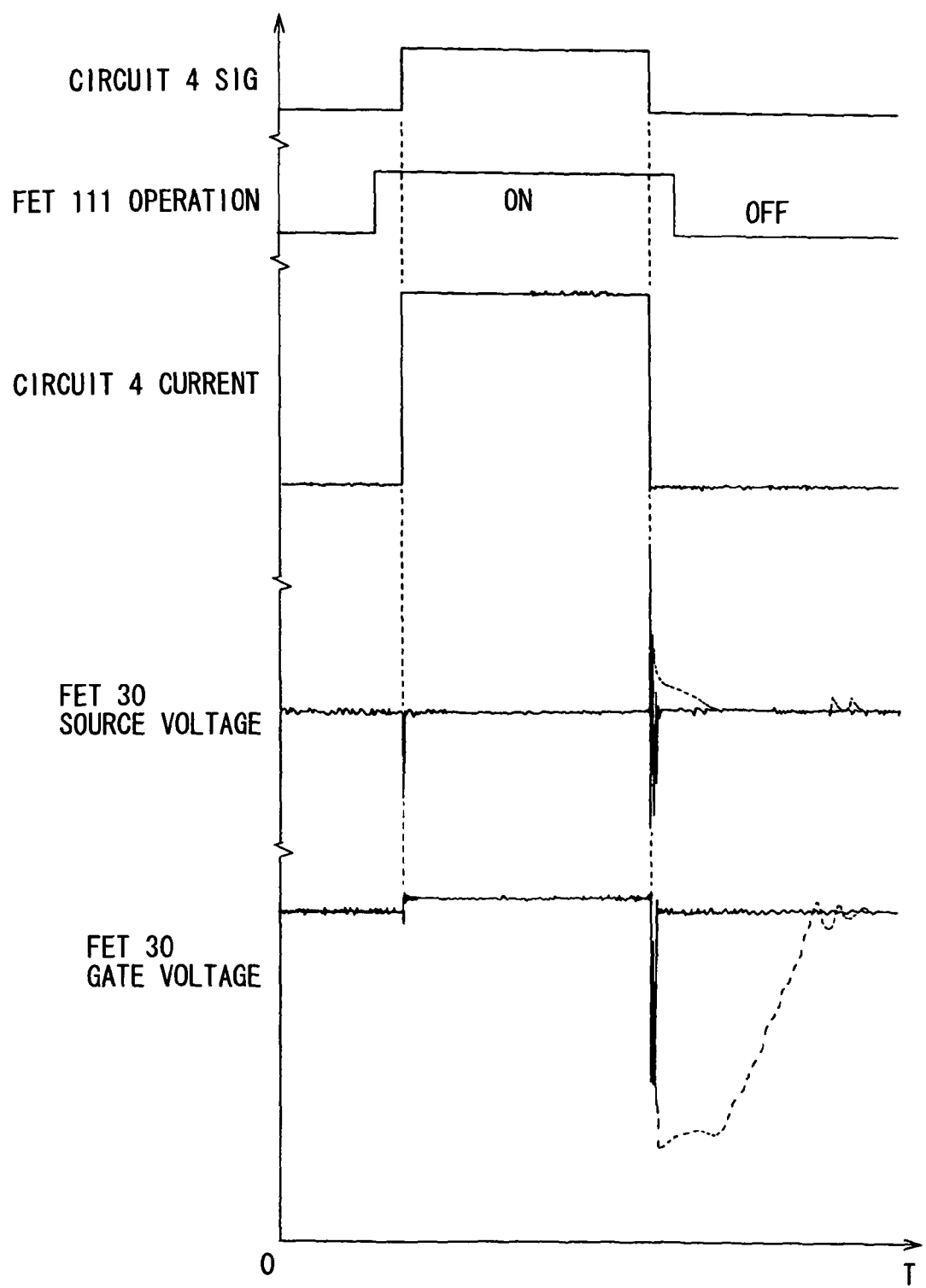
FIG. 2 shows an illustration of wave forms when the air bag apparatus is operated.

The operation of the air bag apparatus is explained referring to FIG. 1 and FIG. 2 in the following. FIG. 2 is an illustration of wave patterns of each part to explain the operation of the air bag apparatus.

In FIG. 1, the op-amp 32*a* amplifies the source voltage of the third FET 30 divided by the resistors 31*a*, 31*b* by referring to the voltage of the reference supply 32*b* as a standard. The third FET 30 is driven based on the output of the op-amp 32*a*, and the voltage of the backup power supply 2 is converted to the predetermined target voltage to be supplied for the ignition circuits 4-6 by the FET 30.

Figure 3:
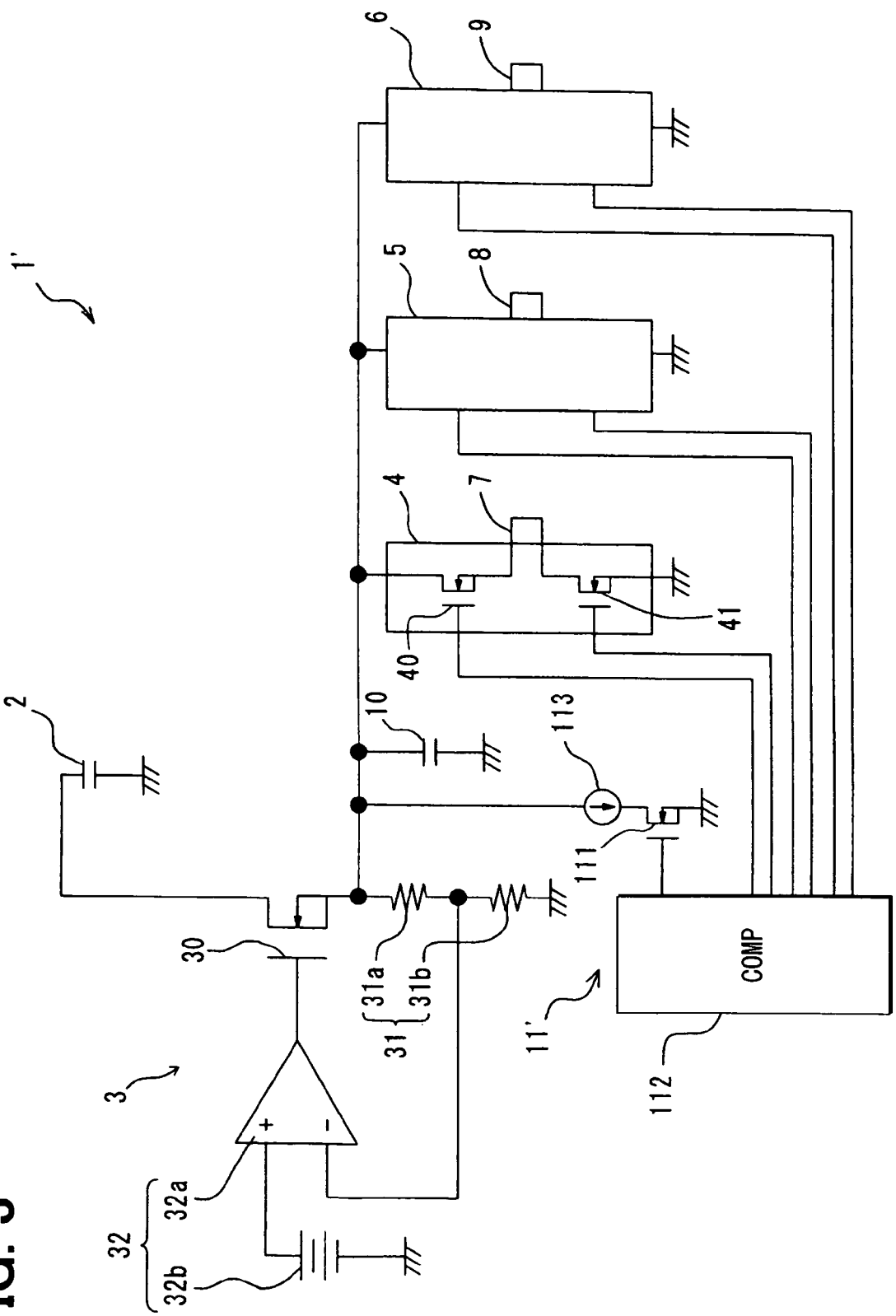
FIG. 3 shows a block diagram of an air bag apparatus in another embodiment of the present invention.

When it is determined that the vehicle has collided based on the information from various sensors, for example, the microcomputer 112 outputs the ignition signal for the ignition circuit 4 as shown in FIG. 3 to deploy the air bag. In addition, the FET 111 for electric discharges is turned on before 10 μseconds prior to the output of the ignition signal until 10 μseconds after the output for operating the discharge circuit 11. When the high side FET 40 and the low side FET 41 become the ON state based on the ignition signal, the ignition electric current flows to the connected squib 7. Then, the ignition electric current is intercepted when the high side FET 40 and the low side FET 41 become the off state based on the ignition signal. Further, the electric current flowing in the circuit flows into the capacitor 10, and the capacitor 10 is charged. However, because the FET 111 for electric discharges is in the ON state at the moment, the electric charge accumulated in the capacitor 10 is discharged through the resistor 110 immediately. Therefore, as shown in a dashed line, the source voltage of the third FET 30 is not maintained after a steep rise. In addition, the gate voltage is not maintained in a lowered state to lower the source voltage of the third FET 30 as shown in a dashed line. Thus, the voltage stabilizer 3 can supply the predetermined target voltage in a stable manner. By the above operation scheme, the ignition electric current which is sufficient for the squibs 8 and 9 can be supplied by the ignition circuits 5, 6 immediately after the ignition electric current is supplied to the squib 7 by the ignition circuit 7.

The advantageous effects of the embodiment are explained in the following. That is, the electric discharge circuit 11 consisting of the FET 111 for electric discharges and the microcomputer 112 can discharge the accumulated electric charge in the resistor 110 in the present embodiment. Therefore, a voltage rise of the capacitor 10 occurring just after the end of the supply of the ignition electric current can be resolved immediately. Thus, the source voltage of the third FET 30 is lowered, and the voltage stabilizer 3 will not be operated. As a result, the ignition electric current can be supplied stably to each of the plural squibs 7-9.

In addition, according to the present embodiment, the microcomputer 112 outputs the ignition signal based on the information from various sensors installed on the vehicle. Therefore, the supply end time of the ignition electric current can be recognized based on the ignition signal. Thus, the capacitor 10 can be securely discharged immediately after the supply of the ignition electric current is finished.

Although the present invention has been fully described in connection with the preferred embodiment thereof with reference to the accompanying drawings, it is to be noted that various changes and modifications will become apparent to those skilled in the art. That is:

In the present embodiment, the turn-on time of the FET 111 for electric discharges is defined between 10 μseconds prior to the output and 10 μseconds after the output of the ignition signal. However, the turn-on time of the FET 111 may be differently defined. In other words, the FET 111 is turned on at least for a predetermined time after the end of the output of the ignition signal.

Further, in the present embodiment, the electric discharge circuit 11 is exemplified as a circuit having the resistor 110, the FET 111 for electric discharges and the microcomputer 112, the discharge circuit 11 may have different configuration. For example, a constant current source 113 may be used in place of the resistor 110 as shown in FIG. 3. The constant current source 113 enables the electric discharge circuit 11' to have the same advantageous effects as the circuit 11 in combination with the FET 111 for electric discharges and the microcomputer 112.

Such changes and modifications are to be understood as being within the scope of the present invention as defined by the appended claims.

What is claimed is:

1. A vehicle occupant protection apparatus comprising:
a power source capable of supplying electric power;
a constant voltage circuit capable of outputting a predetermined voltage by converting a voltage of the power source in an electrical connection with the power source;
a plurality of ignition circuits capable of supplying an ignition current for respective squibs by having an electrical connection with the power source;
a capacitor capable of reducing noise, wherein the capacitor is in an electrical connection with a connection point between the constant voltage circuit and the plurality of ignition circuits on one end, and wherein the capacitor is in an electrical connection with a ground on another end; and
a discharge circuit capable of discharging electricity stored in the capacitor immediately after a supply of the ignition current from an ignition circuit has finished being delivered.

2. The vehicle occupant protection apparatus of claim 1, wherein
the discharge circuit includes a resistor having one end connected to one end of the capacitor, a discharge switching element having one end connected another end of the resistor for grounding the another end of the resistor at a time of turning on, and a discharge control circuit capable of turning on the discharge switching element immediately after the supply of the ignition current from an ignition circuit has finished being delivered.

3. The vehicle occupant protection apparatus of claim 1, wherein
the discharge circuit includes a constant electric current source having one end in an electrical connection with one end of the capacitor for supplying a predetermined current from one end to another end, a discharge switching element in an electrical connection with the another end of the constant electric current source for grounding the another end of the constant electric current source at a time of turning on, and a discharge control circuit capable of turning on the discharge switching element immediately after the supply of the ignition current from an ignition circuit has finished being delivered.

4. The vehicle occupant protection apparatus of claim 2, wherein
the discharge control circuit controls the plurality of the ignition circuits, and
the discharge control circuit turns on the discharge switching element based on control information of the plurality of the ignition circuits.

5. The vehicle occupant protection apparatus of claim 3, wherein the discharge control circuit controls the plurality of ignition circuits, and the discharge control circuit turns on the discharge switching element based on control information of the plurality of ignition circuits.

* * * * *